United States Patent [19]
Rantz

[11] Patent Number: 5,356,531
[45] Date of Patent: Oct. 18, 1994

[54] REVERSE OSMOSIS WATER SYSTEM HAVING PIVOTING CLAMP DEVICE

[76] Inventor: Tim Rantz, 8261-A Trenton Rd., Forestville, Calif. 95436-9641

[21] Appl. No.: 106,442

[22] Filed: Aug. 16, 1993

[51] Int. Cl.⁵ .................. B01D 17/12; B01D 35/30
[52] U.S. Cl. .................... 210/86; 210/109; 210/232; 210/257.2; 210/259; 248/229; 403/385; 403/389
[58] Field of Search .............. 210/86, 94, 109, 117, 210/188, 195.2, 232, 239, 240, 248, 257.2, 259, 420, 421, 422, 433.1; 403/4, 35, 385, 389; 248/229, 541

[56] References Cited

U.S. PATENT DOCUMENTS

| | | | |
|---|---|---|---|
| 4,049,550 | 9/1977 | Obidniak | 210/433.1 |
| 4,744,895 | 5/1988 | Gales et al. | 210/257.2 |
| 5,078,864 | 1/1992 | Whittier | 210/259 |
| 5,126,041 | 6/1992 | Weber et al. | 210/232 |

Primary Examiner—Joseph W. Drodge
Attorney, Agent, or Firm—Robert M. Sperry

[57] ABSTRACT

An improved reverse osmosis water purification system having improved adjustable clamp means for securing the filter and membrane containers to each other and to the reservoir, together with a discharge hose adapted to minimize splashing and noise, a modified clothespin mounted adjacent the discharge end of the waste water recycling hose to facilitate securing the discharge end of the hose, and means for automatically matching the supply of input water to the water level in the reservoir without requiring manual regulation by the user or complex and expensive electronic control systems and a reservoir with filtered air.

17 Claims, 3 Drawing Sheets

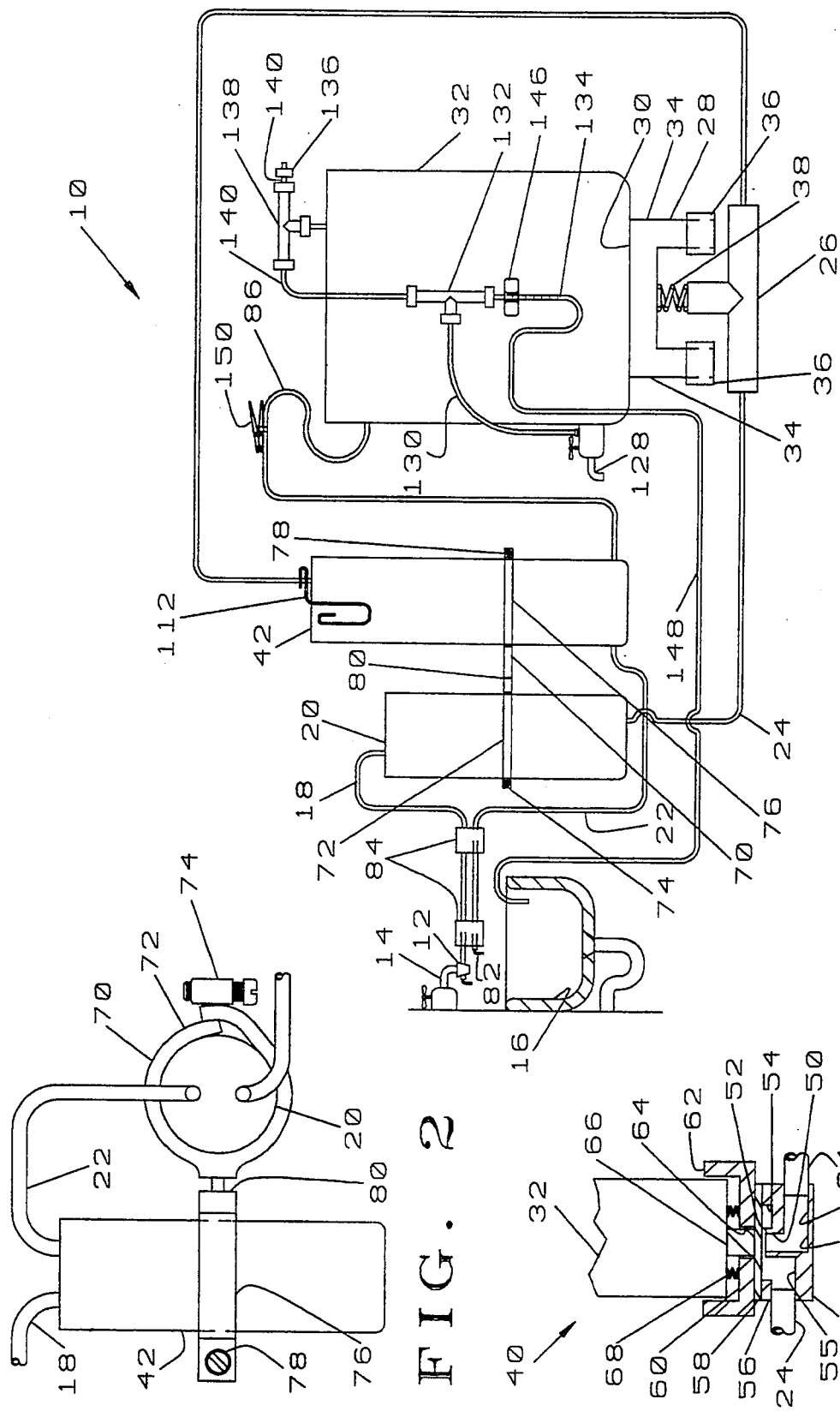

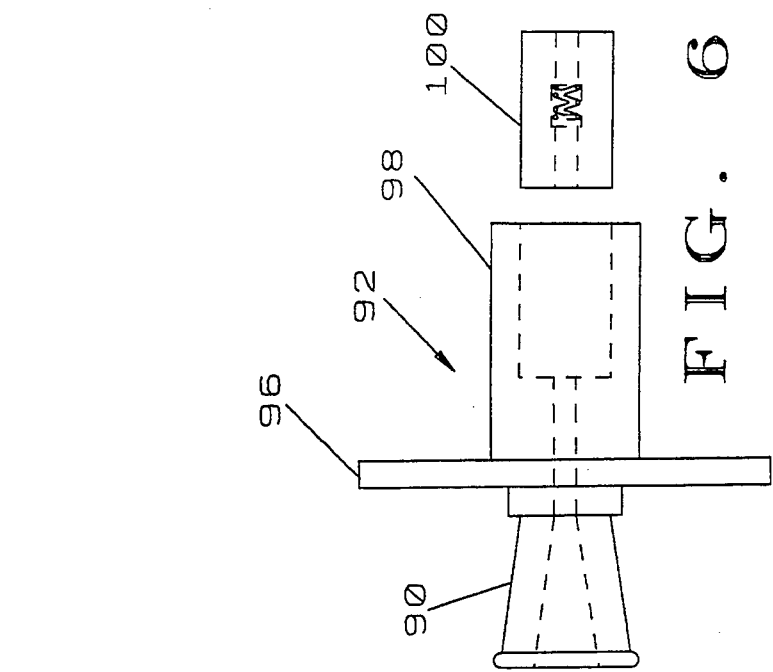
FIG. 6
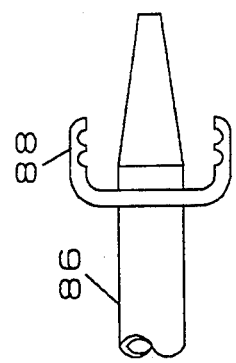
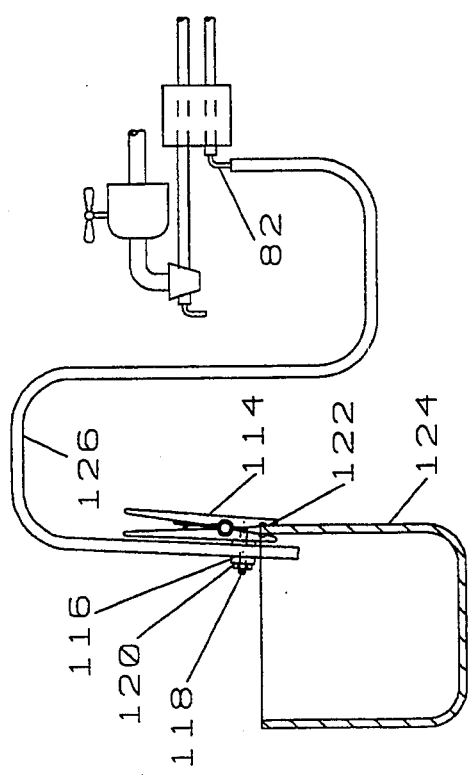
FIG. 4
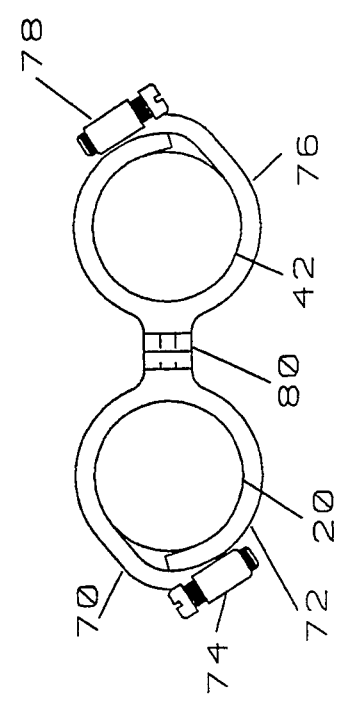
FIG. 5

REVERSE OSMOSIS WATER SYSTEM HAVING PIVOTING CLAMP DEVICE

BACKGROUND

1. Field of Invention

This invention relates to reverse osmosis water systems and is particularly directed to improved reverse osmosis water systems having a manual Start-Up By-pass mechanism and an automatic shut-off valve, and storage reservoir.

2. Prior Art

As is well known, reverse osmosis water purification is accomplished by applying impure water, under pressure, to a semi-permeable osmotic membrane to force pure water to flow through the membrane, while leaving the contaminant materials on the input side of the membrane. However, unless constant pressure is maintained on the input side of the membrane, the pure water will tend to flow back through the membrane. Early reverse osmosis systems required a continuous flow of input water in order to maintain such pressure. Obviously, this was extremely wasteful. On the other hand, if the contaminated water, under no pressure, is allowed to remain in contact with the membrane and the pure water is not drawn off promptly, some of the contaminants will also pass through the membrane and, hence, will recontaminate the "pure" water. Many modern reverse osmosis systems solve this problem by including a by-pass system, which allow such recontamination to occur, but which automatically discharge several cups of water before starting to deliver the allegedly purified water to the reservoir. This eliminates the need for continuous flow of input water. However, the quantity of water discharged by the automatic by-pass system may or may not be appropriate. Thus, in many instances, significant amounts of pure water will be wasted, while, in other cases, some contaminated water will be delivered to the pure water reservoir. This problem is found, particularly, in permanently installed water purification systems, such as the so-called "under the counter" systems. Poor reliability has plagued this by-pass system, so that manual by-pass systems are preferred. With so-called "portable" or countertop systems, if applicable, the user is instructed to discard a preliminary amount of water. However, if frequent or repeated uses occur, the user can safely forego the discard in order to save water. Some countertop water purification systems have a hose which is placed in a nearby sink or fastened and terminated at the kitchen faucet aerator for discharging waste water. This is a substantial amount of water during flushing of the membrane and, unfortunately, this can be noisy and annoying during operation of the portable water purification system. Furthermore, even when care is taken to properly position the discharge hose, for example, to direct the flow against the side of the sink to minimize splashing and noise, air bubbles are often carried in the discharge flow and can cause vibrations which will dislocate the hose so that the noise will return or the discharge flow is discharging in a nondesirable location. Another disadvantage of most reverse osmosis water systems lies in the fact that some way must be provided for matching the quantity of input or supply water to the usage of the purified water. If the input supply is unregulated, vast quantities of input water will be discarded wastefully. Permanent or "under-the-counter" systems, and portable or "counter-top" systems usually employ electrical or hydraulic valves and electronic circuitry to sense the level or quantity of water in the reservoir and, as appropriate, to actuate the valve to pass input water to restore the desired level or quantity. Most countertop systems avoid the expense and complexity of such control systems, but usually require that the user regulate the input supply manually. This demands constant visual monitoring of the water level in the reservoir and that the user be physically present to start and stop the flow of input water, as needed. Another problem of prior art countertop water systems has been lack of flexibility in design which has seriously limited the locations in which such systems may be placed. Many carbon filters, previously purchased, utilize costly non-disposable chambers that were satisfying the needs of many, but recently, the desire to combine this treatment with a reverse osmosis filter has left non-disposable carbon chambers abandoned. A design to combine the non-disposable carbon chamber with a reverse osmosis filter is needed.

Another problem of the prior art has been the over use of raw materials in the fabrication of a cabinet to house the portable water purification system. Yet another problem is the antiquated method of collecting the waste water for reuse. A further disadvantage of the prior art is the hose used to connect the water purification system to a separate reservoir. If using a plug to keep the hose clean during storage, a damaged reverse osmosis element could result. As is well known in the field that, if the system is turned "ON" without removing such the hose plug, which protects the hose from contamination during storage, and if the system is turned "OFF" with a differential pressure across the membrane, destruction of the membrane will occur. A "fail safe" plug is needed.

An additional disadvantage of the prior art is that no convenient way of storing the hose which connects the purification system to the reservoir has been provided heretofore. Furthermore, all prior art portable water purification systems have had an easily removable reservoir lid. However, curious minds will open this lid, which allows airborne contaminants into the reservoir. A deterrent is needed to prevent this action. Furthermore, many other disadvantages of prior art water purification systems exist regarding storage of pure water. Due to the chemical composition of the pure water, recontamination occurs when the pure water is stored in a petroleum-based container. Moreover, such reservoirs are difficult to clean, since they usually are integral parts of the housing of the water system. Moreover, there is no barrier to prevent air contamination of the pure water. Finally, pure water entering the storage reservoir makes an annoying sound when falling into the body of pure water within the reservoir.

A search in the United States Patent Office has revealed the following:

| U.S. Pat. No. | INVENTOR | ISSUED |
|---|---|---|
| 4,391,712 | T. V. Tyler et al | Jul. 5, 1983 |
| 4,678,565 | W. W. Norton | Jul. 7, 1987 |
| 3,670,892 | W. Baerg et al | Jun. 20, 1972 |
| 4,759,844 | M. Lipschultz et al | Jul. 26, 1988 |
| 4,880,535 | B. D. Burrows | Nov. 14, 1989 |
| 4,049,550 | L. Obidniak | Sep. 20, 1977 |
| 4,609,466 | C. W. McCausland et al | Sep. 2, 1986 |
| 4,744,895 | M. A. Gales et al | May 17, 1988 |

Each of these references is subject to the disadvantages discussed above. Thus, none of the prior art reverse osmosis water systems have been entirely satisfactory.

BRIEF SUMMARY AND OBJECTS OF INVENTION

These disadvantages of the prior art are overcome with the present invention and an improved countertop reverse osmosis water purification system is provided which is simple and inexpensive to purchase, simple to install and operate and which is extremely flexible in design to permit adaptation of the design to accommodate substantially any desired location from the sink, yet which provides automatic regulation of the input supply without the complexity and expense of electronic circuitry and without requiring manual observation and operation by the user.

These advantages of the present invention are preferably attained by providing an improved countertop reverse osmosis water purification system having improved clamp means for securing the filter chamber and membrane housing to the reservoir, together with a discharge hose adapted to minimize splashing noise, and a modified clothespin mounted adjacent the discharge end of the waste water recycling hose to facilitate securing the discharge end of the hose, and having means for automatically matching the supply of input water to the water level in the reservoir without requiring manual regulation by the user or complex and expensive electronic control systems.

Accordingly, it is an object of the present invention to provide an improved reverse osmosis water purification system.

Another object of the present invention is to provide an improved reverse osmosis water purification system which is simple and inexpensive to purchase, simple to install and operate.

An additional object of the present invention is to provide an improved reverse osmosis water purification system which is extremely flexible in design to permit adaptation of the design to accommodate substantially any desired location from the sink.

A further object of the present invention is to provide an improved reverse osmosis water purification system which provides automatic regulation of the input supply without the complexity and expense of electronic circuitry and without requiring manual observation and operation by the user.

A specific object of the present invention is to provide an improved reverse osmosis water purification system having improved clamp means for securing the filter chamber and membrane housing to the reservoir, together with a discharge hose adapted to minimize splashing and noise, and a modified clothespin mounted adjacent the discharge end of the waste water recycling hose to facilitate securing the discharge end of the hose in a position to minimize splashing and noise and having means for automatically matching the supply of input water to the water level in the reservoir without requiring manual regulation by the user or complex and expensive electronic control systems.

These and other objects and features of the present invention will be apparent from the following detailed description, taken with reference to the figures of the accompanying drawing.

BRIEF DESCRIPTION OF THE DRAWING

FIG. 1 is a diagrammatic representation of a portable water purification system embodying the present invention;

FIG. 2 is a plan view of the purification system of FIG. 1, shown with the membrane housing mounted in the horizontal position;

FIG. 3 is a vertical section through an alternative form of the overflow regulator of the water purification system of FIG. 1;

FIG. 4 is an enlarged detail showing an improved clip for releasably attaching the waste water recycling hose to a desired container for recycling of the waste water;

FIG. 5 is a plan view of the double clamp for attaching the membrane housing to the filter chamber of the water purification system of FIG. 1;

FIG. 6 is a "fail-safe" feature preventing damage to the reverse osmosis membrane if the product hose plug is not removed during start-up by-pass;

DETAILED DESCRIPTION OF THE INVENTION

Figure 9:
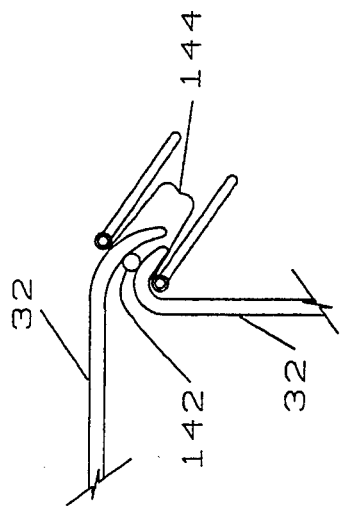
FIG. 9 is an O-ring and binder clip which seal the reservoir lid to the body of the reservoir. These components, when used in conjunction with others, prevent airborne contamination from entering the reservoir.

In that form of the present invention chosen for purposes of illustration, FIG. 1 shows a portable water purification system, indicated generally at 10, having a flow diverter 12 which is releasably attachable to the spigot 14 of a conventional sink 16. Water from the diverter 12 is delivered by hose 18 to a filter chamber 20, which contains a suitable filter mechanism, such as activated carbon granules or the like. Hoses 18 and 22 can accomodate a distance from the sink to the portable water purification system, without the problem of excess hoses, by wrapping the surplus hoses around the base of the filter chamber 20. After passing through the filter chamber 20, the water passes through hose 24 to an overflow regulator 26, which comprises a generally U-shaped member 28 having a horizontal member 30, which supports the reservoir 32, and has a pair of vertical legs 34 having ring magnets 36 mounted on the lower ends of the legs 34. The hose 24 passes through to a normally-closed, magnetically actuated overflow valve 26, when the reservoir 32 is full. Resilient means, such as spring 38, normally supports the horizontal member 30 and reservoir 32 sufficiently to allow the overflow valve 26 to remain closed when the reservoir 32 is full. However, if the reservoir 32 becomes filled above a desired level, the weight of the additional water will force member 30 downward, against the urging of spring 38. Thus, when the magnets 36 moves into proximity with the overflow valve 26, the magnets 36 will cause the overflow valve 26 to close. Obviously, as the water level in the reservoir 32 decreases, the weight of the water in reservoir 32 will similarly decrease, allowing the spring 38 to raise the reservoir 32 and allowing overflow valve 26 to open. Thus, the overflow valve 26 will pass water only when the water level in the reservoir 32 is below the desired level.

Figure 8:
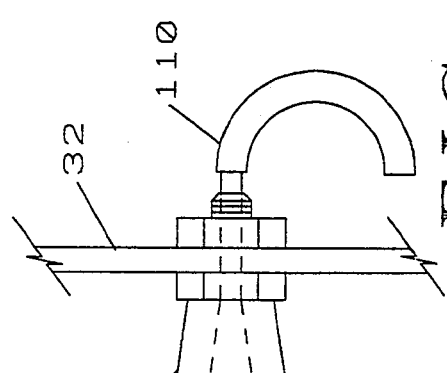
FIG. 8 is a purified water reservoir inlet fitting attached to the reservoir which directs the flow of water into the reservoir onto the reservoir wall to prevent water noise.
Figure 7:
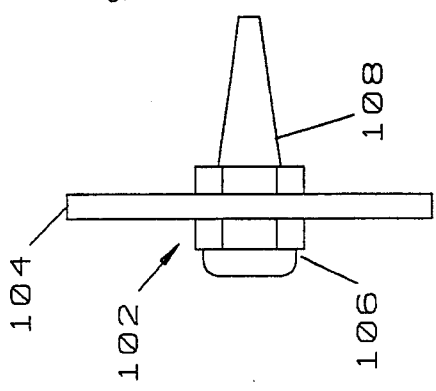
FIG. 7 is a purified water reservoir inlet plug to seal the reservoir when it is not being filled.

FIG. 3 shows an alternative form of overflow regulator, indicated generally at 40, which is connected into the supply hose 24 between the filter chamber 20 and the membrane housing 42. As seen in FIG. 3, the overflow regulator 40 has a body 44 formed with a channel 46 to allow water to flow through supply hose from the filter chamber 20 into the membrane housing 42. The channel 46 has a horizontal inlet conduit 48, which communicates with the lower end of a central vertical conduit 50. At the upper end, the vertical conduit 50 has a neck 52 which projects upwardly into a chamber 54 and an outlet conduit 55 communicates with the chamber 54 and with the supply hose 24 on the discharge side 56 of the body 44. A resilient sheet 58 covers the top of the body 44, serving as a lid for the chamber 54, and an annular member 60 is mounted above the resilient sheet 58 and is formed with a peripheral flange 62 which serves to retain the reservoir 32. The annular member 60 has a central opening 64 and a piston 66 is located within the opening 64, resting on the resilient sheet 58. Resilient means, such as spring 68, normally lifts the reservoir 32 above the annular member 60. However, when excessive water is contained within the reservoir 32, the weight of the excess water will force the reservoir 32 downward, against the action of spring 68, and will serve to drive the piston 66 and resilient sheet 58 downward. This serves to restrict the flow of water through supply hose 24 from the filter chamber 20 and, if the water level in the reservoir 32 exceeds a desired level, the increased weight of the reservoir 32 on piston 66 will force the resilient sheet 58 to completely close neck 52 to shut off the flow of supply water to the membrane housing 42. From either regulator 26 or 40, water passes through to a membrane housing 42, which contains a suitable membrane for reverse osmosis purification of the water. As seen in FIGS. 1, 2 and 5, a double clamp 70 serves to releasably attach the membrane housing 42 to the filter chamber 20 to prevent separation and undesired movement thereof. The clamp 70 has a first portion 72 which encircles the filter chamber 20 and is secured thereto by suitable means, such as hose clamp 74. The second portion 76 encircles the membrane housing 42 and is releasably secured thereto by suitable means, such as hose clamp 78. The first portion 72 and second portion 76 of the double clamp 70 are secured together by a pivot means 80, which is selectably movable between a first position, as seen in FIG. 1, in which the axis of the membrane housing 42 is supported parallel to the axis of the filter chamber 20, and a second position, as seen in FIG. 2, wherein the axis of the membrane housing 42 is supported perpendicular to that of the filter chamber 20. Where vertical space is more available than horizontal space, the position of FIG. 1 is preferred. However, where vertical space is limited, the position of FIG. 2 allows the taller membrane housing 42 to be supported horizontally, which reduces the overall height requirements of the water purification system 10. As is well known, the reverse osmosis membrane in the membrane housing 42 serves to separate the waste water, which is discharged through waste water hose 22 and elbow 82 into the sink 16. As seen in FIG. 1, collar 84 supports hose 18 to hose 22. Twisting collar 84, to direct the waste water flow from barb 82 onto the side of the sink 16 to minimize noise. As seen in FIG. 6, pure water passes through purified output hose 86, through quick disconnect connector 88. Connector 88 mates to connector 90 of the system plug, indicated generally at 92, and is secured thereto by suitable means, such as a male thread to female thread, when the portable water purification system is not purifying water. System plug 92 consists of washer 96, to prevent a child from swallowing, and dowel 98 to house the check valve 100. When the portable water purification system is filling reservoir 32, refer to FIG. 8, connector 88, from FIG. 6, mates to connector 94 which is attached to the reservoir 32. To prevent noise of water filling reservoir 32, a hose 110, attached to connector 94, directs the purified water from the portable water purification system to the inside wall of reservoir 32. As seen in FIG. 7, a tank plug, indicated generally at 102, attaches to connector 94, in FIG. 8, to keep reservoir 32 free of contaminants when the portable water purification system is not filling the reservoir 32. Plug 102 consists of washer 104, to prevent a child from swallowing, nut 106 and connector 108. As seen in FIG. 1, when storing purified output hose 86, the hose 86 may be attached to the top of the housing 42 by an appendage 112, in the form of a formed wire hook.

As seen in FIG. 1, if desired, instead of dumping into the sink 16, the waste water from the waste water barb 82 may be saved for "gray water" use on lawns, gardens, washing and the like. To accomplish this, as seen in FIG. 4, a clothes pin 114 is provided, having a hose clamp 116 attached thereto by suitable means, such as bolt 118 and nut 120. As seen in FIG. 4, the clothes pin 114 may be clipped onto the lip 122 of any suitable container 124 and the waste water recycling hose 126 may be pushed onto barb 82, so as to empty the waste water into the container 124 for storage and subsequent reuse as so-called "gray water".

An air filtering device and visual reservoir level hose, for the purified water, are shown in FIG. 1. As water is purified and enters reservoir 32, purified water can be seen travelling from spigot 128, up visual reservoir level hose 130 and, if not using either regulator 26 or 40, when it reaches the level of tee 132, gravity allows the water to pass into overflow hose 148, through air trap 134, and to exit into the sink 16. Air trap 134 can be formed using hose clamps fastened to suitable means, such as a support for the reservoir 32 which raises the reservoir 32 off of a counter. Air displaced from reservoir 32, as the reservoir 32 fills, exits through air filter 136, which also prevents siphoning at tee 132. Tee 138, attached to the lid of reservoir 32, connects air filter 136 and tee 132 with hoses 140. As seen in FIG. 9, an O-ring 142, between sections of reservoir 32, is sealed with several binder clips 144. These binder clips 144 also act as a deterrent against undesired opening of the lid of reservoir 32, which would allow airborne contaminants to enter the reservoir 32. As seen in FIG. 1, hose clamp 146 attaches permanently to reservoir 32 to support tee 132 and hoses 130, 140 and 148. If not utilizing the aforementioned air filtering components to filter the air in contact with the purified water in the reservoir 32, these components may be removed and a vinyl cap, not shown, may be applied where hose 140 connected to tee 132 with an anti-siphon hole over the leg of tee 132.

During the discharge of several cups of contaminated water from the product hose 86, during initial start up by-pass, prior to collecting the purified water in reservoir 32, the clothespin assembly, described earlier in FIG. 4, is duplicated and attached to product hose 86, as indicated generally at 150 in FIG. 1, to be fastened to any suitable means to prevent air being released from dislocating the purified output hose 86 to a non-appropriate location and to prevent connector 88 of FIG. 6 from contacting a soiled surface. Clothes pin 150 can be anchored to the finger support of a glass jug or the like, being used as a purified water reservoir, to prevent the connector 88 from exiting the jug.

By using a fabric cover, which is easily cleanable in a clothes washer, it is possible to minimize the amount of plastic that would otherwise be needed to build a cabinet for concealing the components of the portable water purification system.

To use a large three-legged stand, when using the overflow regulator valve 26 of FIG. 1 or 40 of FIG. 3, to maintain a level reservoir at different levels of purified water, use a spring in each of the two legs that are equivalent to that which is used in the third leg incorporating the overflow regulator valve 26 or 40.

Figure 10:
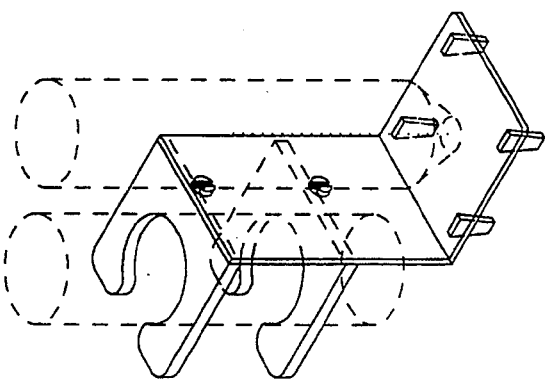
FIG. 10 is an alternative means for fastening a filter chamber to a membrane housing using a minimal amount of materials.

As seen in FIG. 5, the double clamp 70, which serves to change the orientation of the filter chamber 20 with respect to the membrane housing 42, is good for the style of filter chamber used by such companies as Multi-Pure Corporation. FIG. 10 is an alternative to those means for fastening a filter chamber 20 to a membrane housing 42 which are commonly used and utilizes the least amount of material. However, both of these can be eliminated by incorporating a single injection molded product to replace the following components: filter chamber 20, membrane housing 42, double clamp 70, appendage 112, overflow regulators 26 or 40, means to stabilize the portable water purification system for safe use, and the conduit for the channels of fluid.

As seen in FIG. 1, visual reservoir level hose 130 has a groove at both ends, with a color in the grooves, such as red, that will visually signal the owner of a poor fluid connection.

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A water purification system for attachment to a sink having a spigot, said system comprising:
   a flow diverter releasably engageable with a spigot;
   a filter chamber connected to receive water from said flow diverter;
   a membrane housing containing a reverse osmosis membrane connected to receive water from said filter chamber;
   a double clamp device having a first portion releasably secured to said filter chamber, a second portion releasably secured to said membrane housing, and pivot means connecting said first and second portions and selectably movable between a first position holding said membrane housing parallel with said filter chamber and a second position holding said membrane housing perpendicular to said filter chamber; and
   a wastewater hose connected to discharge waste water from said membrane housing.

2. The water system of claim 1 further comprising:
   a reservoir connected to receive and store pure water from said membrane housing.

3. The water system of claim 2 further comprising:
   an overflow regulator arranged for preventing the water level in said reservoir from exceeding a desired level.

4. The water system of claim 3 wherein:
   said overflow regulator is responsive to the weight of water in said reservoir and serves to discharge excess water from said reservoir when said water exceeds a desired level within said reservoir.

5. The water system of claim 3 wherein:
   said overflow regulator serves to prevent additional water from being supplied to said membrane housing when the weight of water in said reservoir reaches a desired quantity.

6. The water system of claim 3 wherein:
   said overflow regulator comprises an magnetically operable valve,
   a platform supporting said reservoir,
   means resiliently supporting said platform, and
   magnet means carried by said platform and operable when the weight of water contained in said reservoir reaches a preselected level to actuate said valve.

7. The water system of claim 3 wherein:
   said overflow regulator comprises a valve body having a central chamber with an open upper surface,
   inlet means connected to supply water into said chamber adjacent said upper surface,
   outlet means connected to discharge water from said chamber,
   a resilient sheet covering said open upper surface of said chamber, and
   means resiliently supporting said reservoir and operable when the weight of water contained in said reservoir reaches a preselected level to cause said resilient sheet to close off said inlet means.

8. The water system of claim 3 further comprising:
   a multi-legged stand supporting said reservoir, and
   means carried by at least one of said legs for levelling said reservoir.

9. The water system of claim 2 wherein:
   said reservoir has a removable lid, and
   means releasably securing said lid to said reservoir to prevent unauthorized removal of said lid.

10. The water system of claim 9 further comprising:
    an air tight seal between said lid and said reservoir.

11. The water system of claim 2 further comprising:
    an air filter connected to pass air into and out of said reservoir in response to a changing level of pure water in said reservoir,
    an air trap connected between said air filter and an overflow hose, and
    a transparent reservoir level indicating hose connected between the output of said reservoir and a point located between said air filter and said air trap.

12. The water system of claim 11 wherein:
    said level indicating hose is formed with a groove in at least one end of said hose having colored means in said groove to provide a visual indication when said level indicating hose has a poor connection.

13. The water system of claim 2 further comprising:
    means for directing water being supplied to said reservoir against a side of said reservoir to minimize noise.

14. The water system of claim 1 further comprising:
    a clothes pin having two legs resiliently connected by a spring, and a hose clamp fixedly secured to one leg of said clothes pin to releasably attach said wastewater hose to said clothes pin whereby said clothes pin may be releasably attached to a desired container to direct the discharge of said wastewater recycling hose into said container.

15. The water system of claim 1 further comprising:
a check valve connected to regulate the flow of pure water out of said membrane housing to prevent damage to said membrane from misuse.

16. The water system of claim 15 wherein:
said check valve is mounted in a hose plug.

17. The water system of claim 1 further comprising:
means for causing said waste water hose to direct said wastewater against a side of said sing to minimize noise.

* * * * *